May 13, 1930.  J. G. GRANTHAM  1,758,363
CORN HUSKING PEG
Filed May 18, 1926

Inventor
Jesse G. Grantham
By L. B. James
Attorney

Patented May 13, 1930

1,758,363

UNITED STATES PATENT OFFICE

JESSE G. GRANTHAM, OF JACKSONVILLE, ILLINOIS; BESSIE HENDERSON GRANTHAM, EXECUTRIX OF SAID JESSE G. GRANTHAM, DECEASED

CORN-HUSKING PEG

Application filed May 18, 1926. Serial No. 109,956.

This invention relates to harvesting implements and more particularly to corn husking pegs.

The primary object of this invention resides in the provision of a corn husking peg with which an individual can husk corn and manipulate his hands with the same freedom exercised in shucking without the use of the husking peg.

Another object of this invention resides in the provision of a corn husking peg of such shape that it somewhat conforms to the contour of ears of corn.

A further object of this invention resides in the provision of a corn husking peg of such shape and construction that certain fingers of the hand, upon which it is removably secured, will be free to grasp or partially surround a portion of an ear of corn so as to firmly hold the same to permit removal of the corn from the husks.

A still further object of this invention resides in the provision of a corn husking peg having husk piercing prongs adapted to lie at angles tangently disposed to the body of the husking peg.

In addition to the aforesaid objects, this invention resides in the provision of a corn husking peg adapted to conform somewhat to the shape of an ear of corn and lie in contact with the fingers of an individual's hand, so as to permit certain fingers to grasp the ear of corn while the remaining fingers procure sufficient grasp on the husking peg to readily manipulate it in releasing the husk from the ear.

Aside from the foregoing objects, this invention resides in the provision of a corn husking peg adapted to be strapped or otherwise secured to the hand of an individual, so a guard carried by the husking peg will protect the fingers when thrusting the husking peg toward the base of the ear.

With these and other objects in view, this invention resides in certain novel features of construction, arrangement and combination of elements to be hereinafter set forth in the specification, illustrated in the accompanying drawing and pointed out in the appended claim and, while the disclosure herein presented depicts my present conception of the invention, the right is reserved to resort to such changes in construction as come within the scope of the claim.

In the accompanying drawing, forming a part of this application:

Figure 1:
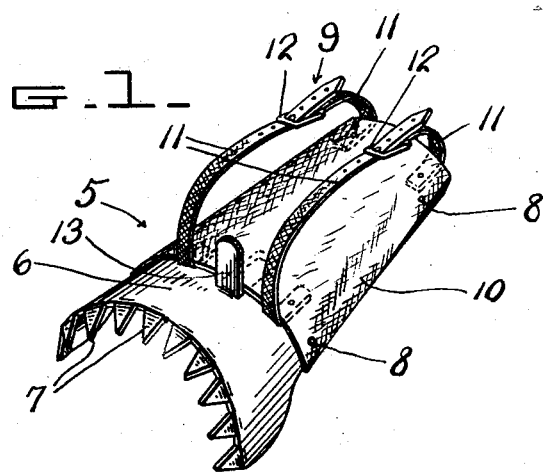
Fig. 1 is a perspective view of a corn husking peg constructed in accordance with the invention.
Figure 2:
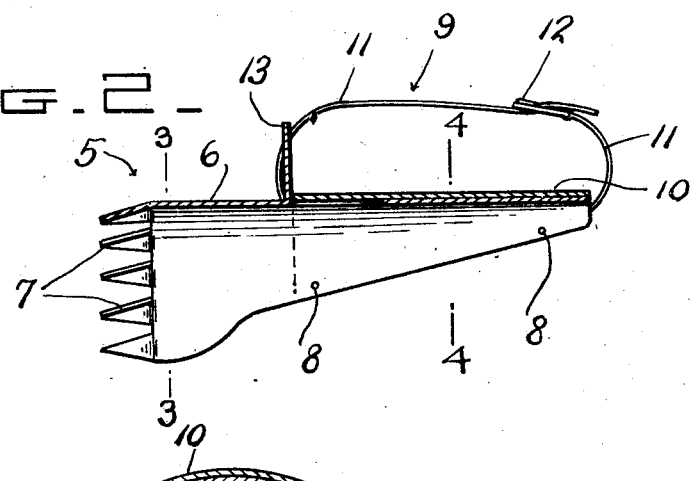
Fig. 2 is a longitudinal sectional view thereof.
Figure 3:
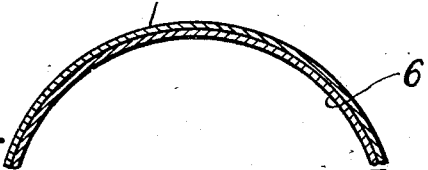
Fig. 3 is a sectional view, on an enlarged scale, taken on line 3—3 of Fig. 2.
Figure 4:
Fig. 4 is a similar view on line 4—4 of Fig. 2.

In the present embodiment of this invention, the numeral 5 designates, in general, a corn husking peg which preferably consists of an arcuate shaped body member 6 of tapering configuration having a common radius throughout its length with the side edges of the larger end thereof occupying less than 180 degrees of a circle and the side edges of the smaller end occupying lesser degrees of the same circle, so as to somewhat conform to the general shape of ears of corn, the larger end of the body member is provided at opposite sides with extensions 6' having their side edges merged into the side edges of the body member adjacent the larger end of the body member.

The larger extremity of the aforesaid body member including the extensions is provided with a series of prongs 7 which are preferably deflected inwardly on plains tangentially disposed to that upon which the body member lies, so as to readily penetrate corn husks and elevate the same while being thrust therethrough.

Secured, as by rivets 8 or the like, to the body member is a holster 9 which preferably consists of a sheet of leather or other suitable material 10, carrying straps 11 adapted to be adjustably tightened over the hand through the instrumentality of suitable buckles 12 or the like.

Stamped from or otherwise associated with the body member of the husking peg is a guard 13 which is preferably disposed in advance of the holster 9 and, while I have herein utilized but a single guard, a plurality of the same may be employed in furtherance of the protective advantages attained with a single guard.

With the aforesaid body member constructed in the particular manner set forth, it is apparent that the husking peg can be readily secured in operative position on the hand, so as to somewhat coincide with the contours of ears of corn and, through the medium of providing a tapered corn contacting area, certain fingers of the hand will be free to grasp or partially surround the smaller end of the corn while the remaining fingers can be utilized to operate the husking peg to advantage. This salient feature of the invention permits the individual to extend certain of his fingers beyond the edge of the husking peg and grasp the smaller end of the corn with that hand to which the husking peg is secured and remove the corn from the husk subsequent to turning the husk back or toward the larger end of the corn.

Having thus fully described my invention, what I claim and desire to protect by Letters Patent is:

A corn husking peg comprising a body having one end flared, said body being of arcuate shape in cross section, inwardly deflected prongs at the extremity of the flared end of the body, an upstanding guard formed on the body adjacent the flared end, longitudinally extending straps disposed on opposite sides of the guard with their forward ends secured substantially in align with the guard, a cover secured to the body beneath the straps and having its forward edge engaging the guard whereby the adjacent straps deflect upwardly in align with the guard.

In testimony whereof I affix my signature.

JESSE G. GRANTHAM.